April 9, 1957
S. A. OAKLEY
2,788,430
GAS SAVING WELD BOX
Filed July 28, 1955
3 Sheets-Sheet 1
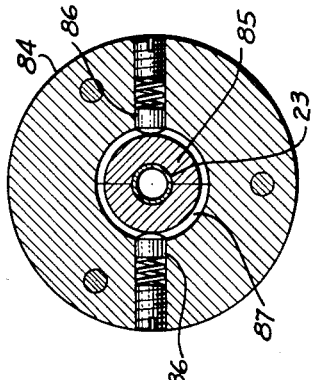
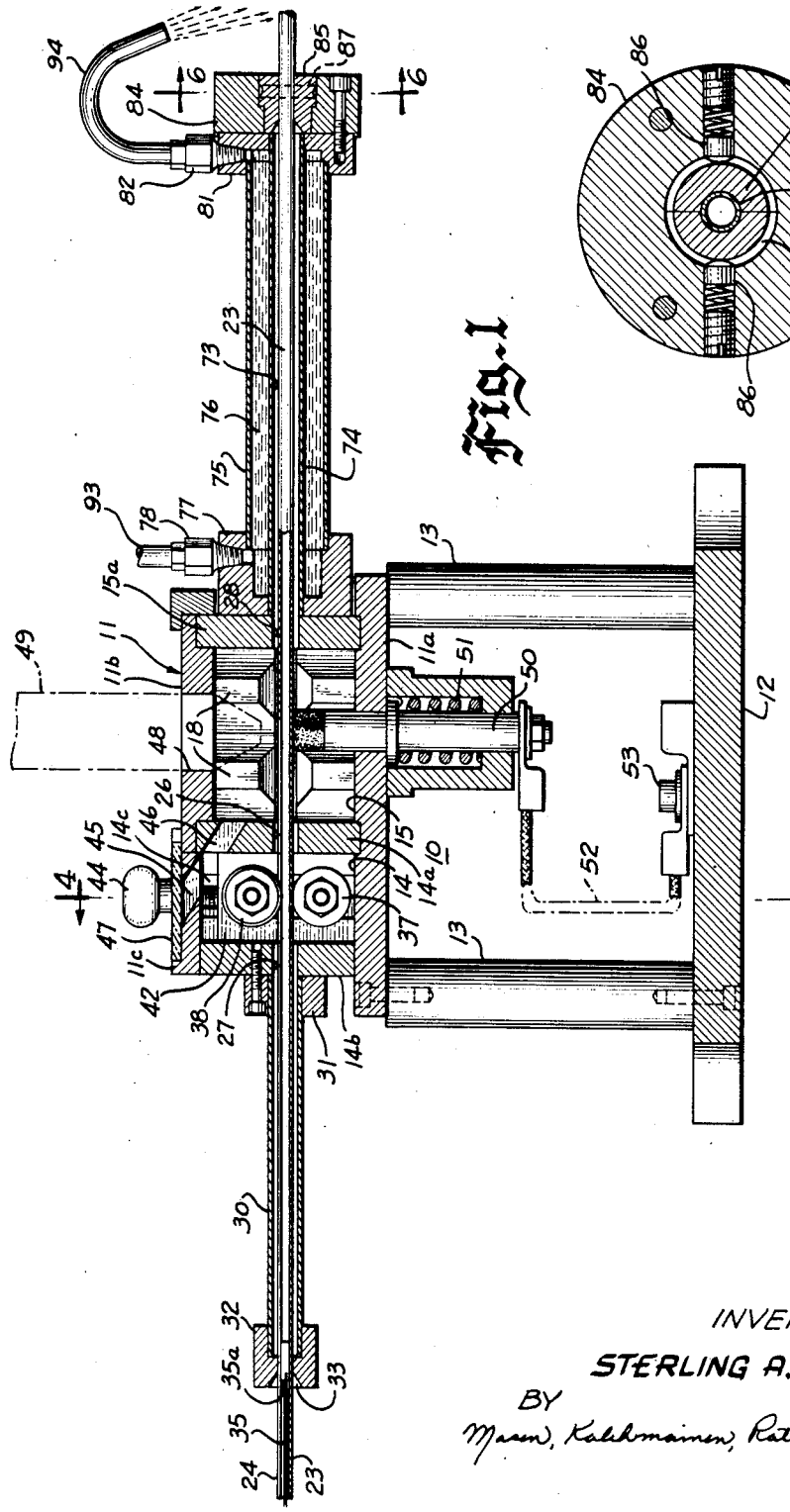
INVENTOR
STERLING A. OAKLEY
BY
Mason, Kolehmainen, Rathburn and Wyss
ATTORNEYS

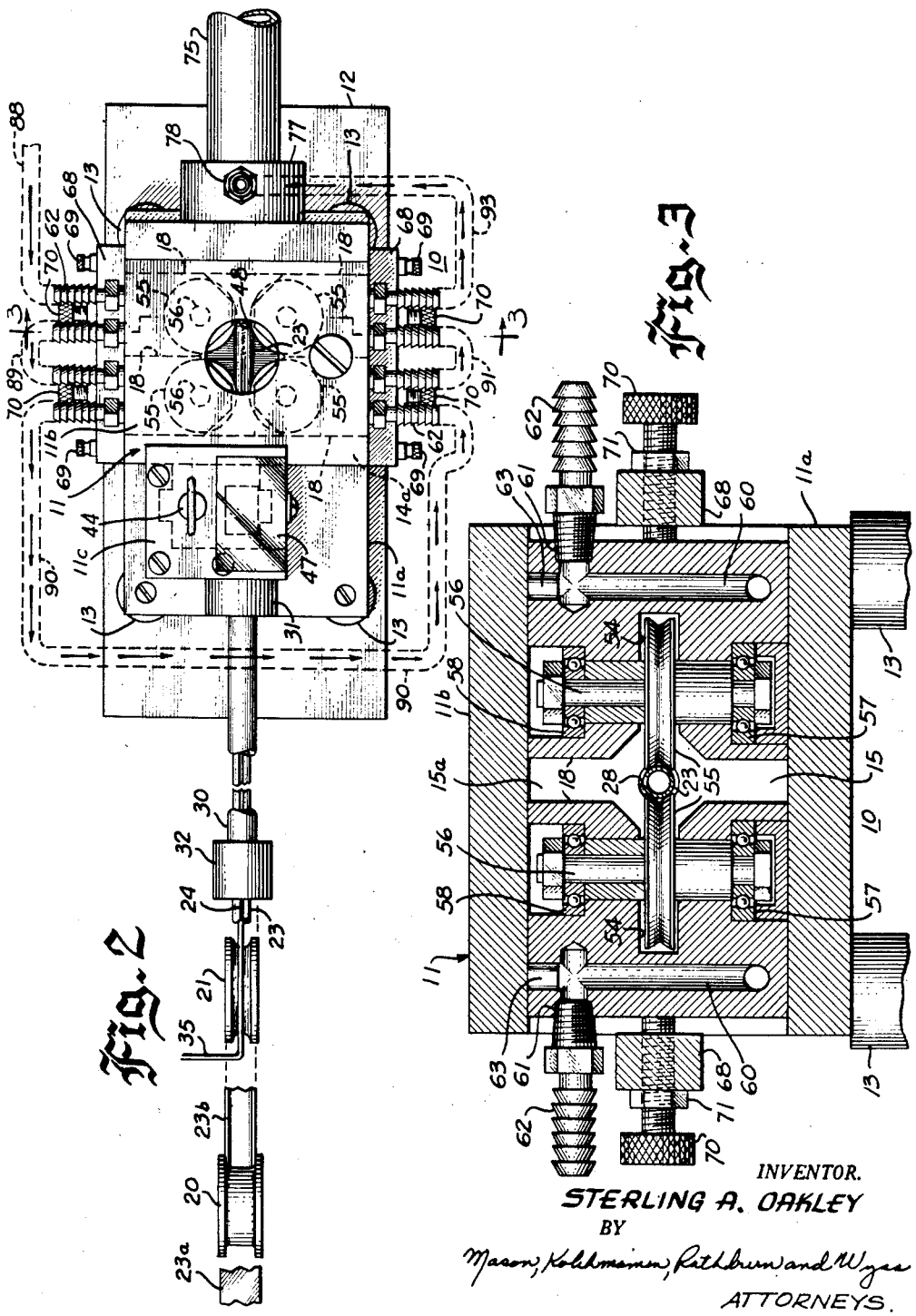

April 9, 1957
S. A. OAKLEY
2,788,430
GAS SAVING WELD BOX
Filed July 28, 1955
3 Sheets-Sheet 3
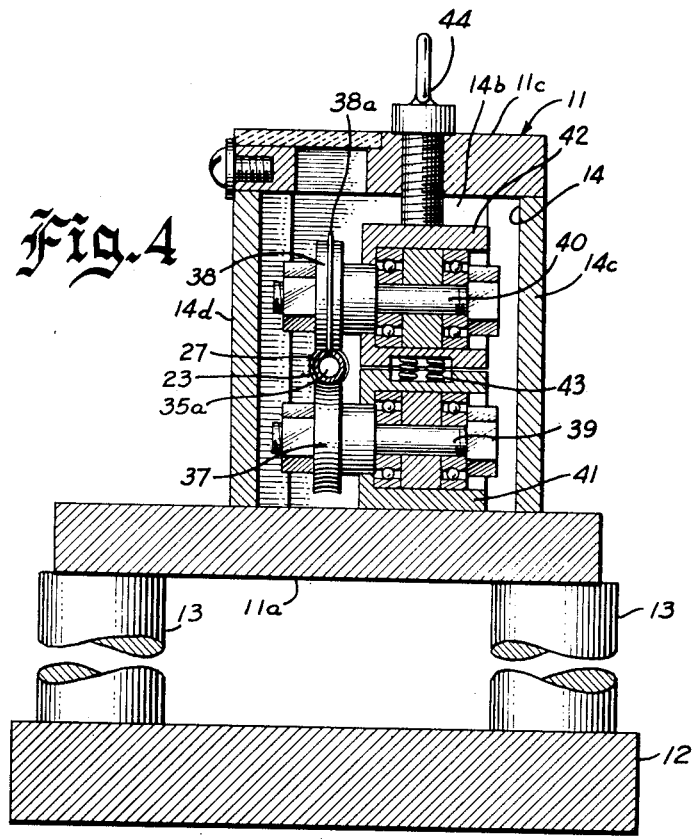
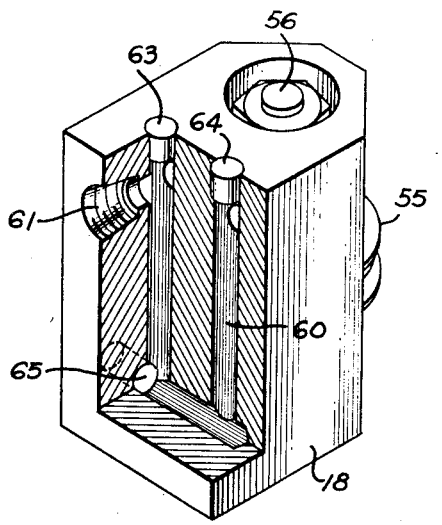
INVENTOR.
STERLING A. OAKLEY
BY
ATTORNEYS

United States Patent Office 2,788,430
Patented Apr. 9, 1957

2,788,430

GAS SAVING WELD BOX

Sterling A. Oakley, Lincolnwood, Ill.

Application July 28, 1955, Serial No. 524,935

10 Claims. (Cl. 219—74)

The present invention relates to a gas saving weld box and method of using the same, and more specifically to such a weld box useful in connection with welding the seams in metal tubing.

Welded tubing, which is extensively used today for many purposes, such as, for example, airplane struts, fluid carrying conduits and sheaths for heating elements, is constructed of a rectangular sheet of metal which is formed into a cylinder and welded along the abutting edges thereof to form a longitudinally welded seam. Although the present invention finds application in the forming of steel tubing of all types, for convenience in explaining the invention and to facilitate an understanding thereof, it is described in connection with the manufacture of sheaths for heating elements of the type commonly used in electric ranges, electric flatirons, electric cooking vessels, electric dryers and the like. Sheathed heating elements of this type comprise an outer metal sheath which houses therein a helical resistance wire. In order to support this resistance wire centrally of the sheath and in spaced insulated relationship therewith, the sheath is filled with a compacted mass of material which is a good electrical insulator but at the same time a good heat conductor, so that the heat from the resistance element is readily transmitted to the sheath. A common material used for this purpose is fused magnesium oxide. It will be apparent that the sheaths employed in connection with such sheathed heating elements must be formed of a material which will withstand high temperatures and which will not deteriorate when repeatedly subjected to such temperatures over long periods of time. Today many sheaths are commonly formed from a high nickel chromium alloy. One such alloy is sold on the market under the trademark "Inconel." "Inconel" contains, roughly, 80% nickel, 13% chromium, and 6% to 7% iron. There are also materials as for example Incalloy, which has a lower nickel content somewhat of the order of 60%, and which is also satisfactory for forming the sheath of sheathed heating elements.

Such sheaths are commonly formed from flat strip material formed by suitable forming rollers into the desired tubular shape. This results in tubing with an open seam, and it is necessary to close the seam in the tubing thus formed, which is commonly done by a seam-welding process. One welding process satisfactory for this purpose employs a gas-shielded arc. To supply the gas-shielded arc has required extensive quantities of inert gases such as helium or argon, both of which are relatively expensive. Moreover, helium, besides being expensive, is under Government control and only limited quantities are available. It is common in such welding processes to employ thirty to forty cubic feet of gas per hour, which tends to make the process prohibitive. It would be desirable to provide a gas-shielded welding process in which the amount of shielding gas employed could be cut down by a factor of ten or the like without in any way impairing the welding operation.

Accordingly, it is an object of the present invention to provide an improved apparatus for welding with a gas-shielded arc which greatly reduces the amount of gas employed in the welding operation.

It is another object of the present invention to provide a new and improved gas saving weld box.

It is a further object of the present invention to provide a new and improved method of welding.

It is another object of the present invention to provide an improved process of welding the seams of welded seam tubing.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

Fig. 1 is an elevational view in longitudinal section illustrating the apparatus of the present invention;

Fig. 2 is a somewhat enlarged top plan view of Fig. 1, assuming that Fig. 1 shows the complete structure, and further schematically disclosing a portion of the tube-forming apparatus preceding the welding apparatus of the present invention;

Fig. 3 is an enlarged sectional view taken on line 3—3 of Fig. 2;

Fig. 4 is an enlarged sectional view taken on line 4—4 of Fig. 1, again assuming that Fig. 1 shows the complete structure;

Fig. 5 is a perspective view, partly in section, of a portion of the apparatus employed in the arrangement of Figs. 1 and 2 of the drawings; and Fig. 6 is an enlarged sectional view taken on line 6—6 of Fig. 1, again assuming that Fig. 1 shows the complete structure.

Briefly, the present invention is directed to a structure and method of using the same, useful in connection with welding tubing for defining the sheaths of sheathed heating elements, and specifically comprises apparatus within which the seam in seamed tubing is welded in a manner greatly to cut down the quantity of arc shielding gas employed in accomplishing this result. Means are provided to confine around the welding zone the gas supplied with a gas-shielded arc welding process. Simple means are provided to insure that the welded seam is properly held until the molten seam is sufficiently cool to insure that no change in shape will occur. Means for rapidly cooling the welded tubing are also provided.

Referring now to the drawings, there is illustrated the gas saving weld box of the present invention generally designated by the reference numeral 10. This device comprises a housing generally indicated at 11, which may be supported in any suitable manner. As illustrated, the housing 11 is supported in elevated position above a base 12 by means of suitable columns or supports 13. As is best shown in Fig. 1 of the drawings, the housing 11 defines therein two interconnected chambers designated as 14 and 15, respectively. These chambers are defined by a common bottom member 11a and a two-part top member comprising parts 11b and 11c. The chamber 14 is furthermore defined in addition to top 11c and bottom 11a by a wall member 14a common to the chambers 14 and 15, and a wall member 14b disposed in spaced, parallel relationship with the wall member 14a. The other two sides of the chamber 14 are closed by wall members 14c and 14d, respectively, thereby defining a rectangular chamber which is effectively an entrance chamber preceding the chamber 15 as far as the seamed tubing to be welded is concerned.

The chamber 15, on the other hand, is defined by the bottom and top walls 11a and 11b respectively and common wall 14a already described, as well as by a wall 15a disposed in spaced, parallel relationship with the walls 14a and 14b. The other walls of the chamber 15 are defined by a plurality of relatively movable members 18, which, as will become apparent from the following description, provide pincher roller supporting members and simultaneously held to define the chamber 15 as will become more apparent from the ensuing description. The chambers 14 and 15 may be defined by walls of any suitable material which will withstand the relatively high temperatures involved. It has been found that a brass material is entirely satisfactory, although, obviously, any other suitable material may be employed without departing from the present invention.

The present invention is concerned with a continuous welding process for welding the seam of seamed tubing useful for forming the sheaths of sheathed heating elements, and preferably this tubing is formed from continuous strip material just prior to welding the seam thereof. In Fig. 2 of the drawings there has been schematically illustrated the tube forming process or at least a few stages in the process of forming the seamed tubing from a flat strip. As illustrated, a flat strip of the desired material, indicated somewhat schematically at 23a in Fig. 2 of the drawings, passes through a succession of forming rollers such as 20, 21 and the like, and is successively converted, first to a somewhat U-shaped form as indicated at 23b, and then to a substantially closed tubular from shown at 23, with a seam 24 defined between the edges of the strip which have been brought close to abutting relationship. Obviously, such tubing cannot be formed with only two sets of forming rollers such as 20 and 21, and in actual practice a larger number of forming rollers are employed, gradually converting the flat strip to successive shapes which eventually arrive at an open-seamed tube such as 23. Such tube-forming machines are well-known in the art and form no part of the present invention. The portions thereof schematically indicated in Fig. 2 are merely for the purpose of better understanding the present invention. In any event, it should be understood that a major portion of the tube-forming machine has been omitted for the sake of simplifying the drawings.

In accordance with the present invention, the continuous tubing 23, with the open seam 24, passes through the gas saving weld box 10 of the present invention, and to this end the walls 14a, 14b and 15a are provided with aligned openings designated at 26, 27 and 28, respectively, whereby the tubing 23 may readily move therethrough. It will be understood that the openings 26, 27 and 28 are somewhat larger than the tubing 23, and, consequently, any gas within the chambers 14 and 15 may pass freely through the space between the tubing 23 and the edges of these openings.

In order to reduce to a minimum the escape of gas through the opening 27, there is defined an entrance gas chamber comprising a tube 30 which has one end thereof suitably secured in sealed relationship with the wall 14b as by means of a collar 31. The other end of the tube 30 remote from the wall 14b is provided with a bushing 32 having an opening therein snugly fitting around the tubing 23 thereby defining a substantially closed chamber within the tube 30 for confining any gas which escapes through the opening 27 in wall 14b. This bushing 32 has a diverging entrance portion designated as 33 to facilitate the entry of tubing into the snugly fitting opening contained in the bushing 32. It will be apparent that sheathed heating elements may employ sheaths of various sizes, and the gas saving weld box of the present invention is useful in manufacturing tubing for making sheaths of various sizes, the tubular member 30 being sufficiently large to accommodate the largest tubing to be manufactured. Under these conditions, a separate bushing 32 will be provided for each size of tubing to be manufactured.

It will be understood that the endless tubing 23 entering the chamber 30 is provided with an open seam 24, and the shielding gas within the chambers 14 and 15 may enter this seam and escape through the tubing ahead of the bushing 32. To prevent this, there is provided what is commonly termed a "swimmer" 35 in the form of an elongated wirelike member having one end supported on a stationary member not shown and entering the tubing at a point during the forming operation where it is sufficiently open to permit ready insertion of the swimmer. The end of the swimmer preferably extends just inside the bushing 32, as is clearly shown in Fig. 1 of the drawings, and includes an enlarged pluglike member 35a having an exterior diameter substantially equal to the interior diameter of the tubing 23. With this arrangement any shielding gas that enters the tubing 23 through the seam 24 cannot escape beyond the pluglike member 35a, and, consequently, the shielding gas is precluded from escaping from the entrance side of the gas saving weld box 10 of the present invention.

It will be appreciated that in order to perform a satisfactory seam-closing operation on continuous tubing, the seam must be in a predetermined position. To this end there are suitably supported within chamber 14 pressure rollers 37 and 38 mounted on suitable horizontal shafts 39 and 40 journalled in suitable bearings, as shown, which bearings are mounted on suitable supports 41 and 42, respectively. The roller 37 preferably has a slightly concave tube contacting surface, while the roller 38 is provided with a sort of knife edge 38a for engaging the seam 24 in the tubing 23. Thus, these rollers will insure that the tubing is positioned in a predetermined manner with the seam upwardly as viewed in Fig. 4 of the drawings. Since the knife edge 38a of the roller 38 extends into the seam 24, it will tend to twist the tubing in the proper manner to make sure that the seam is positioned in exactly the same manner along the length of the tubing. Preferably, the supports 41 and 42 are guided for vertical movement by suitable guide means which may be defined in the walls of chamber 14 whereby the device may be adjusted to accommodate the different sizes of tubing which might be passed through chamber 14. The lower support 41 is effectively fixed in chamber 14 although it may be at different elevations for different sizes of tubing 23. Preferably the supports 41 and 42 are biased apart by springs 43 and a suitable adjustable screw 44 may be provided in the top 11c to apply the proper force between the rollers 37 and 38.

As will become apparent from the following description, the chamber 15 is the welding chamber within which the welding operation for closing the seam 24 is to be performed. It is desirable that this welding operation may be viewed periodically, and to this end the top 11c of chamber 14 is provided with a suitable viewing opening 45 which is illustrated as being disposed at an angle to cooperate with another opening 46 defined in the wall 14a separating chambers 14 and 15. The opening 45 is preferably closed by a suitable dark glass 47 which will withstand the high temperatures involved and which may be of the nature of the glass commonly employed in welding helmets or the like. It will be appreciated that the angular disposition of the openings 45 and 46 is merely by way of example, and, if desired, an elongated opening disposed in a vertical direction may be employed in wall 14a, and an elongated opening may be provided in the member 11c defining the top of chamber 14, which is elongated in the direction of the longitudinal axis of tube 23. With this arrangement it is a simple matter to view the welding operation in chamber 15. At the same time a seal is provided by the glass 47 against the escape of the inert shielding gas employed in the welding operation.

In order to perform the necessary closing of the seam 24 in the tubing 23, any suitable gas-shielded welding apparatus may be employed. The welding process may, for example, comprise that disclosed and claimed in U. S. Letters Patent 2,468,808, Drake, granted May 3, 1949, and the particular apparatus may comprise that disclosed in U. S. Letters Patent 2,376,265, Meredith, granted May 15, 1945. However, the particular construction of the welding apparatus employed with the gas saving weld box of the present invention is immaterial, except that it employs an inert arc-shielded gas. As illustrated in Fig. 1 of the drawings, the top 11b of housing 11 is provided with a suitable opening 48 to receive a suitable welding torch indicated by dashed lines in Fig. 1 of the drawings and designated by the reference numeral 49. The opening 48 will be of such size as to just snugly receive therein the welding torch 49, whereby the escape of shielding gas is prevented. The welding torch 49 will generally comprise a conductive tube which is both an electric welding current conductor and a gas conduit through which the inert shielding gas is supplied, which inert shielding gas is preferably helium, argon or the like. Obviously, the welding torch 49 must be connected to a suitable source of welding current and also to a source of shielding gas.

It is, of course, necessary to complete the electrical connections to the arc welding unit, and to this end the gas saving weld box of the present invention includes a ground electrode 50 which extends into the chamber 15 through a suitable opening provided in the bottom 11a. Preferably this electrode is biased by means of a spring 51 in an upward direction so as to make electrical contact with the tubing 23, which is the workpiece in the particular operation with which the present invention is concerned. The electrode 50 is preferably connected by means of a conductor 52 to a ground terminal 53, which is illustrated as being connected to the base 12. Preferably, the electrode 50 has the portion thereof in electrical contact with the tubing 23 formed of a nonconsumable material such as tungsten, and, generally, the cooperating electrode employed in the welding torch 49 is also a nondepositing electrode such as a tungsten electrode. With this arrangement it will be apparent that the necessary electrical circuit connections are provided for drawing the electric arc to produce the welding action, and furthermore, a supply of inert shielding gas is provided within chamber 15.

In accordance with the present invention, a plurality of pincher roller supporting blocks 18 are provided in chamber 15, four of them being employed, as is clearly shown in Fig. 2 of the drawings. The constructional details of each pincher roller supporting block 18 is best shown in Fig. 5 of the drawings. Each pincher roller supporting block 18 comprises an accurately dimensioned block, so that two of them, placed side by side, will define a closed chamber wall for each side of chamber 15. As is best shown in Fig. 3 of the drawings, each pincher roller supporting block is provided with a centrally disposed recess 54 to receive therein a pincher roller 55, which is journalled for rotation about a vertical axis by means of shaft 56 and bearings 57 and 58. Preferably, the pincher roller supporting blocks 18 are water cooled to protect the bearings 57 and 58, and U-shaped water-cooling chambers 60 are defined in each pincher roller supporting block 18 as best shown in Fig. 5 of the drawings. Preferably also, a tapped opening 61 is provided at the end of each leg of the U-shaped opening 60 so that connectors 62 may be inserted therein for making the necessary cooling water connections which are clearly shown in Fig. 2 of the drawings. These openings may be provided in any suitable manner. If the pincher roller supporting blocks 18 are cast, these openings will be cast directly therein. On the other hand, if the blocks 18 are machined, the U-shaped passageway 60 is obtained by drilling three separate openings, the ends of which are then plugged as by plugs 63, 64 and 65 to define the U-shaped passageway 60. Four pincher roller supporting blocks 18 are inserted in chamber 50 so as to define two sides of the chamber with the pincher rollers 55 mounted for rotation about spaced, parallel, vertical axes to receive the tubing 23 therebetween. It will be appreciated that not only do the pincher roller supporting blocks 18 define movable chamber walls, but they provide means for applying the desired pressure to the sides of the seamed tube 23 immediately prior to and immediately after the welding operation performed within chamber 15.

For the purpose of accurately positioning the pincher roller supporting blocks 18 in chamber 15 so that the pincher rollers 55 apply the desired force to the tubing 23, there is secured to either side of the housing 11 a force bar 68 which may, for example, be secured by the screws 69 to the walls 14a and 15a, respectively. The force bars 68 suitably support adjustable screws 70 which engage the pincher roller supporting blocks 18 on the side opposite the grooves or recesses 54, and it will be apparent that by adjusting the screws 70, the pincher roller supporting blocks 18 may be positioned in any desired manner, and any suitable force may be applied to the tubing 33 through the pincher rollers 55. Preferably, suitable lock nuts 71 are provided to maintain the setting of the screws 70 once they have been adjusted. With this arrangement, the pincher rollers 55 may be positioned as desired, and, of course, other pincher rollers may be provided for accommodating different sizes of tubing to be welded within chamber 15. Also with this arrangement, the pincher rollers 55 may readily be replaced when they have deteriorated with use. The pincher rollers 55 which engage the sides of the tubing at the portion of chamber 15 most remote from chamber 14 accurately hold and position the tubing 23 for a sufficient length of time to permit the molten metal defining the seam to harden, so that the tubing will have the proper shape as it leaves the chamber 15 through the opening 28.

In order rapidly to cool the welded tubing immediately upon leaving the chamber 15, a water-cooled chamber 73 is provided through which the welded tubing 23 must pass. As illustrated, this chamber is defined by a tube 74 which, with another tube 75 concentrically arranged therewith, defines an annular water chamber 76. The ends of tubes 74 and 75 adjacent chamber 15 are supported and connected to a collar member 77 secured to the housing 11. A hollow connector 78 is preferably provided in collar member 77 to permit cooling water to flow therethrough to reach the annular water chamber 76 defined between tubes 74 and 75. The other ends of the tubes 74 and 75 are inserted in a collar member 81 which defines the end of the annular water chamber 76 remote from housing 11 and has a central opening in alignment with and connected to the associated end of chamber 73. A connection 82 in collar member 81 will, with connector 78, insure the necessary exit and entrance passageways for the flow of cooling water through annular chamber 76.

To prevent the escape of the shielding gas which will be contained within the chamber 73 surrounding tubing 23, a suitable collar 84 is secured to the collar member 81, which collar supports a split bushing 85 biased into sealing engagement with the exterior of the tubing 23 by suitable spring biasing means 86. The periphery of the split bushing is provided with a shallow groove 87 to receive the ends of the spring biasing means 86. With this arrangement, the escape of gas from the chamber 73 is precluded.

In Fig. 2 of the drawings, the water-cooling circuit is indicated by dotted lines. As illustrated, a suitable conduit 88 connects a source of cooling water not shown to one of the connectors 62 in one of the pincher roller supporting blocks 18. The other connectors 62 are interconnected by conduits 89, 90 and 91 so as to connect the U-shaped chambers 60 in series with each other and with the water supply conduit 88. A conduit 93 then connects the connector 62 not connected with a suitable conduit to the connector 78 so that all the water-cooling chambers including the chamber 76 are connected in series. To additionally cool the welded tubing 23, a conduit 94 extends from connector 82 in a direction so that water escaping therefrom will impinge on the tubing 23 to cool the same. It will be appreciated that this water may be collected in a suitable tank and returned to the source of cooling water.

In view of the detailed description included above, the operation of the present invention will readily be understood by those skilled in the art. It will be appreciated that the apparatus 10 may be employed in a continuous process of making tubing which has the seam thereof welded within chamber 15. In a simple manner, the desired pressure may be applied by the pincher rollers 55 and a very small quantity of inert gas is required. It has been found that whereas with prior art arrangements thirty to forty cubic feet of gas per hour are employed, with the present invention and producing tubing at the same rate the gas quantity has been reduced to the order of three cubic feet per hour.

While there has been illustrated and described the particular embodiment of the present invention, it will be appreciated that numerous changes and modifications will occur to those skilled in the art, and it is intended in the appended claims to cover all those changes and modifications as fall within the true spirit and scope of the present invention.

What is claimed as new and desired to be secured by Letters Patent of the United States is:

1. A gas saving weld box for use in closing the seam in seamed tubing, comprising means defining a closed welding chamber within which a welding operation utilizing an inert gas-shielded arc is performed to close said seam, means defining aligned openings in opposed walls of said chamber providing a passageway through which a continuous length of said tubing may be moved, means for maintaining the seam in said tubing orientated in a predetermined manner in said chamber, a plurality of movable pincher roller supporting blocks, two walls of said chamber being defined solely by said blocks, and means for adjustably positioning said blocks.

2. For use in an inert gas-shielded welding process for closing the seam in seamed tubing, a gas saving weld box comprising means defining a closed welding chamber, means defining aligned openings in opposed walls of said chamber thereby permitting long lengths of said tubing to move through said chamber, means for insuring that the seam in said tubing is orientated in a predetermined manner in said chamber, a plurality of movable pincher roller supporting blocks, two walls of said chamber being defined solely by said blocks, and means for water-cooling said blocks.

3. Apparatus for welding by an inert gas-shielded welding process the seam in seamed tubing, comprising a gas saving weld box including means defining a closed welding chamber, a plurality of adjustably positioned blocks defining two opposed walls of said chamber, means providing a passageway whereby a continuous length of said tubing may be moved through said chamber, means for preventing the escape through said passageway of the inert gas used in said welding process within said chamber, means supported by said blocks for controlling the position of said tubing in said chamber, and means for cooling said tubing as it leaves said chamber.

4. A gas saving weld box for use in closing the seam in seamed tubing, comprising means defining a closed welding chamber within which a welding operation utilizing an inert gas-shielded arc is performed to close said seam, means defining aligned openings in opposed walls of said chamber providing a passageway through which a continuous length of said tubing may be moved, means for maintaining the seam in said tubing orientated in a predetermined manner in said chamber, a plurality of movable pincher roller supporting blocks, two walls of said chamber being defined solely by said blocks, means for adjustably positioning said blocks, and means extending into said tubing on the entrance side of said chamber for effectively closing the passageway through said tubing thereby preventing the escape of inert gas from said welding operation.

5. The gas saving weld box of claim 1 wherein said supporting blocks are water cooled.

6. For use in an inert gas-shielded welding process for closing the seam in seamed tubing, a gas saving weld box comprising means defining a closed welding chamber within which said inert gas is released and said welding of said seam performed, means defining aligned openings in opposed walls of said chamber thereby permitting long lengths of said tubing to move through said chamber, means for insuring that the seam in said tubing is orientated in a predetermined manner in said chamber, a plurality of movable pincher roller supporting blocks, two walls of said chamber being defined solely by said blocks, and means whereby said welding operation may be viewed without escape of gas from said chamber.

7. For use in an inert gas-shielded welding process for closing the seam in seamed tubing, a gas saving weld box comprising means defining a closed welding chamber, means defining aligned openings in opposed walls of said chamber thereby permitting long lengths of said tubing to move through said chamber, means for insuring that the seam in said tubing is orientated in a predetermined manner in said chamber, a plurality of movable pincher roller supporting blocks, two walls of said chamber being defined solely by said blocks, means defining an annular water chamber enclosing the welding tubing leaving said chamber, means defining a water cooling chamber in each of said blocks, and means for connecting said chambers including said annular chamber in series with each other and to a source of cooling water.

8. Apparatus for welding by an inert gas-shielded welding process the seam in seamed tubing, comprising a gas saving weld box including means defining a closed welding chamber, a plurality of adjustably positioned blocks defining two opposed walls of said chamber, means providing a passageway whereby a continuous length of said tubing may be moved through said chamber, means for preventing the escape through said passageway of the inert gas used in said welding process within said chamber, means supported by said blocks for controlling the position of said tubing in said chamber, water cooling means for cooling said blocks, and water cooling means for cooling said tubing as it leaves said chamber.

9. A gas saving welding box comprising a welding chamber defining structure including movable opposed wall members for compressing and positioning a continuous article to be welded as it is passed through said chamber, means for welding said article while it is disposed in said chamber, and means for maintaining a suitable atmosphere in said chamber.

10. A weld box comprising a plurality of means defining a gas tight chamber in which articles are adapted to be welded, certain ones of said means being adjustable with respect to one another for applying a pressure of adjustable magnitude to said articles.

References Cited in the file of this patent
UNITED STATES PATENTS 2,179,176     Dunn                  Nov. 7, 1939
2,464,402     Kentis                Mar. 15, 1949